July 11, 1939.   C. A. DREISBACH   2,165,461
SHIFTING DEVICE FOR AUTOMOBILES
Filed June 4, 1937   6 Sheets-Sheet 1
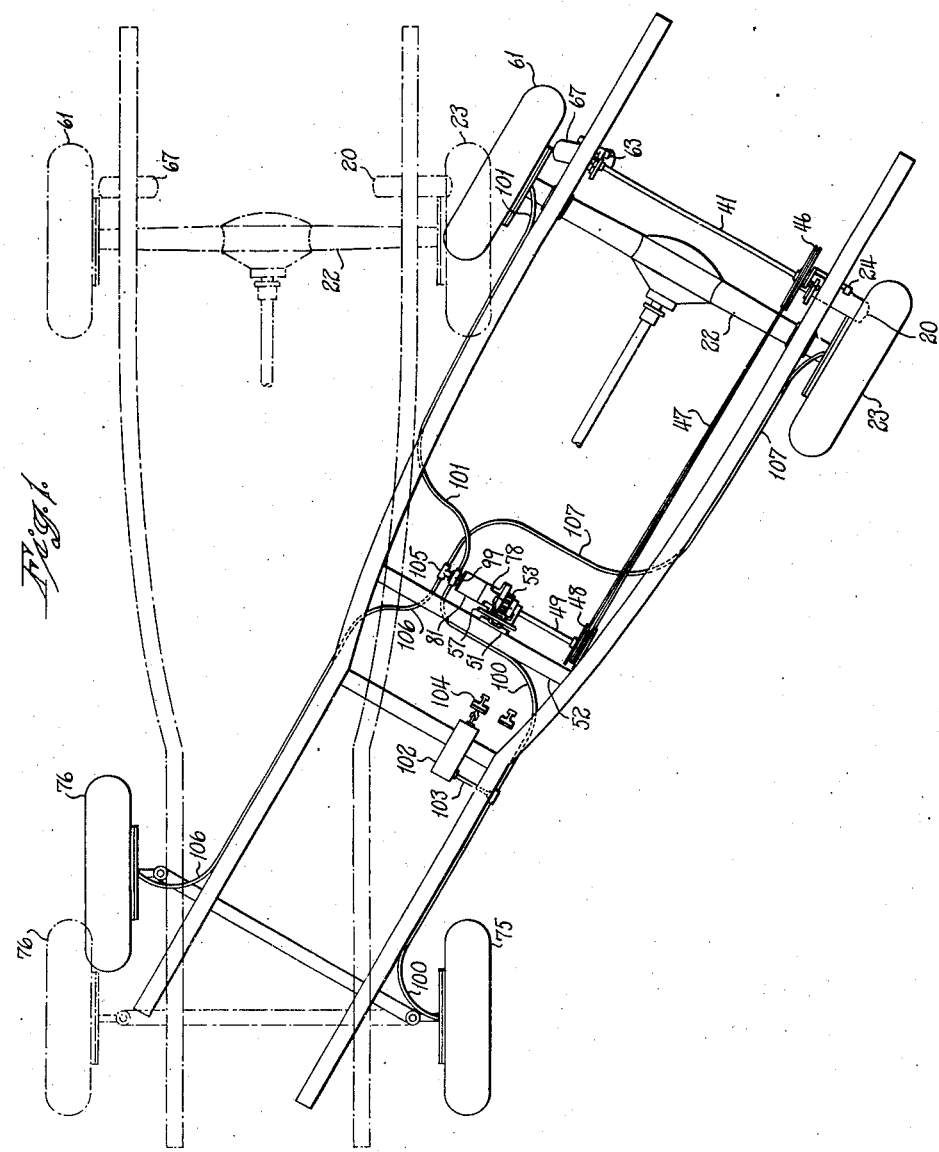
Inventor
Charles A. Dreisbach
By Seymour Earle & Nichols
Attorneys

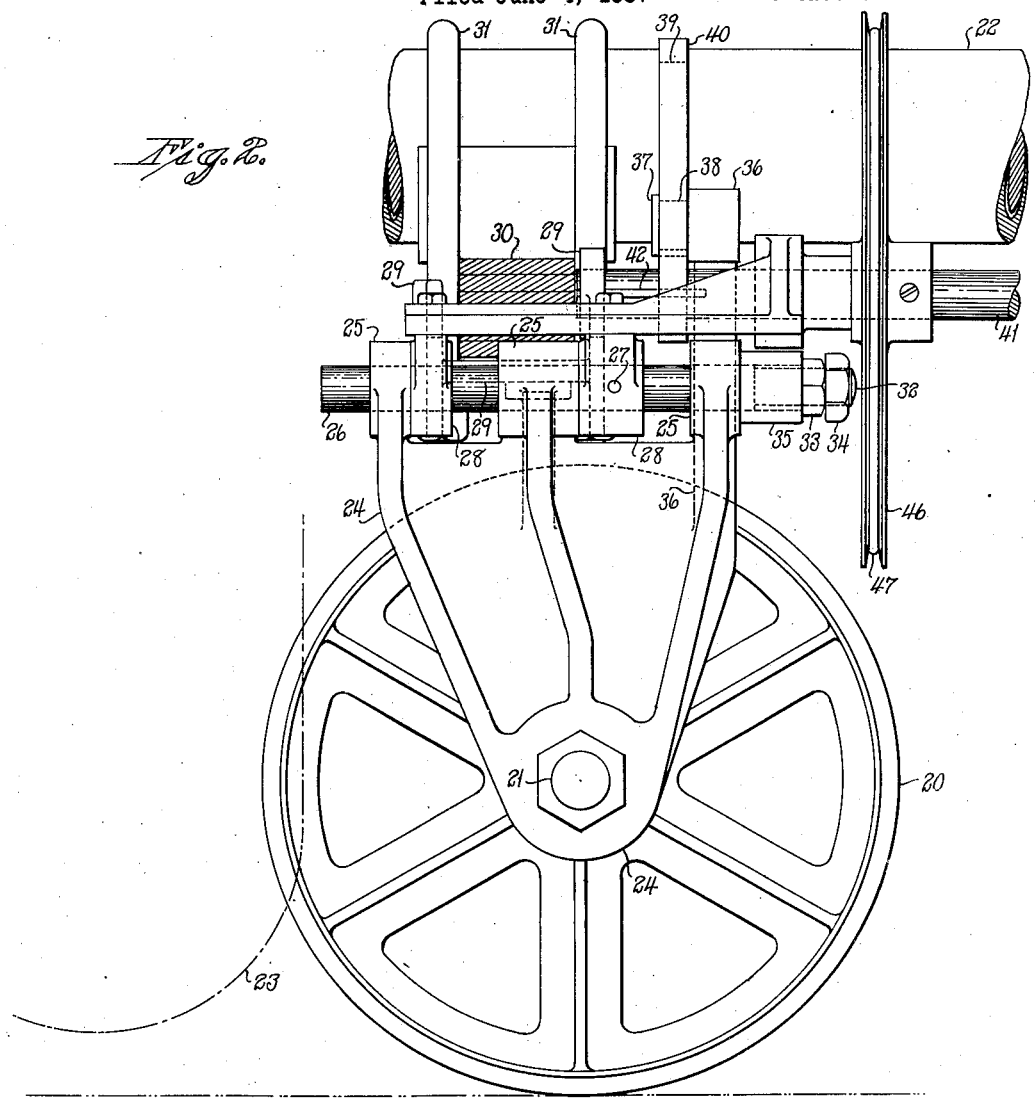

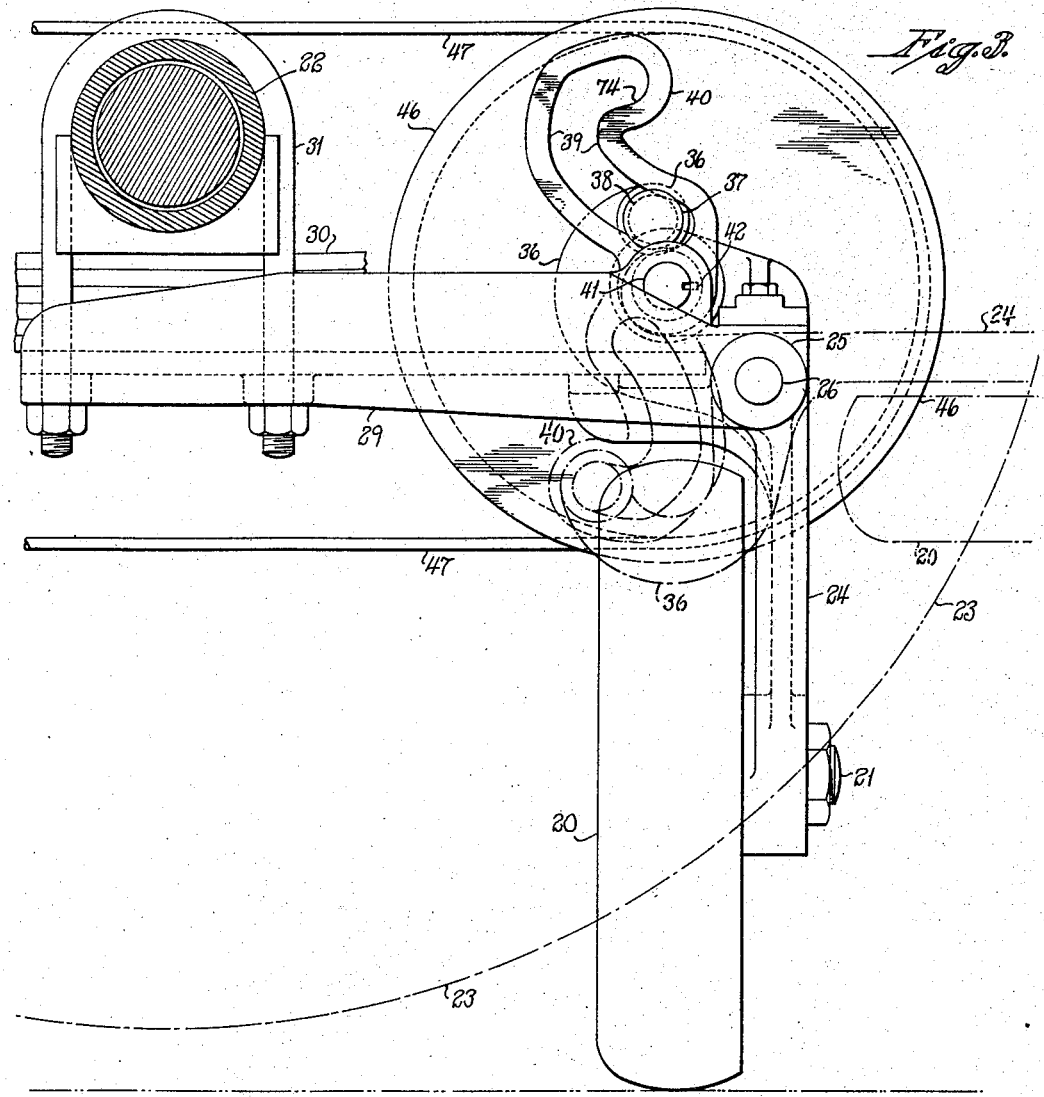//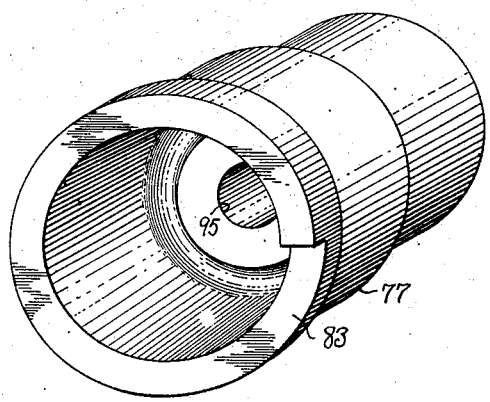

July 11, 1939.　　C. A. DREISBACH　　2,165,461
SHIFTING DEVICE FOR AUTOMOBILES
Filed June 4, 1937　　6 Sheets-Sheet 4
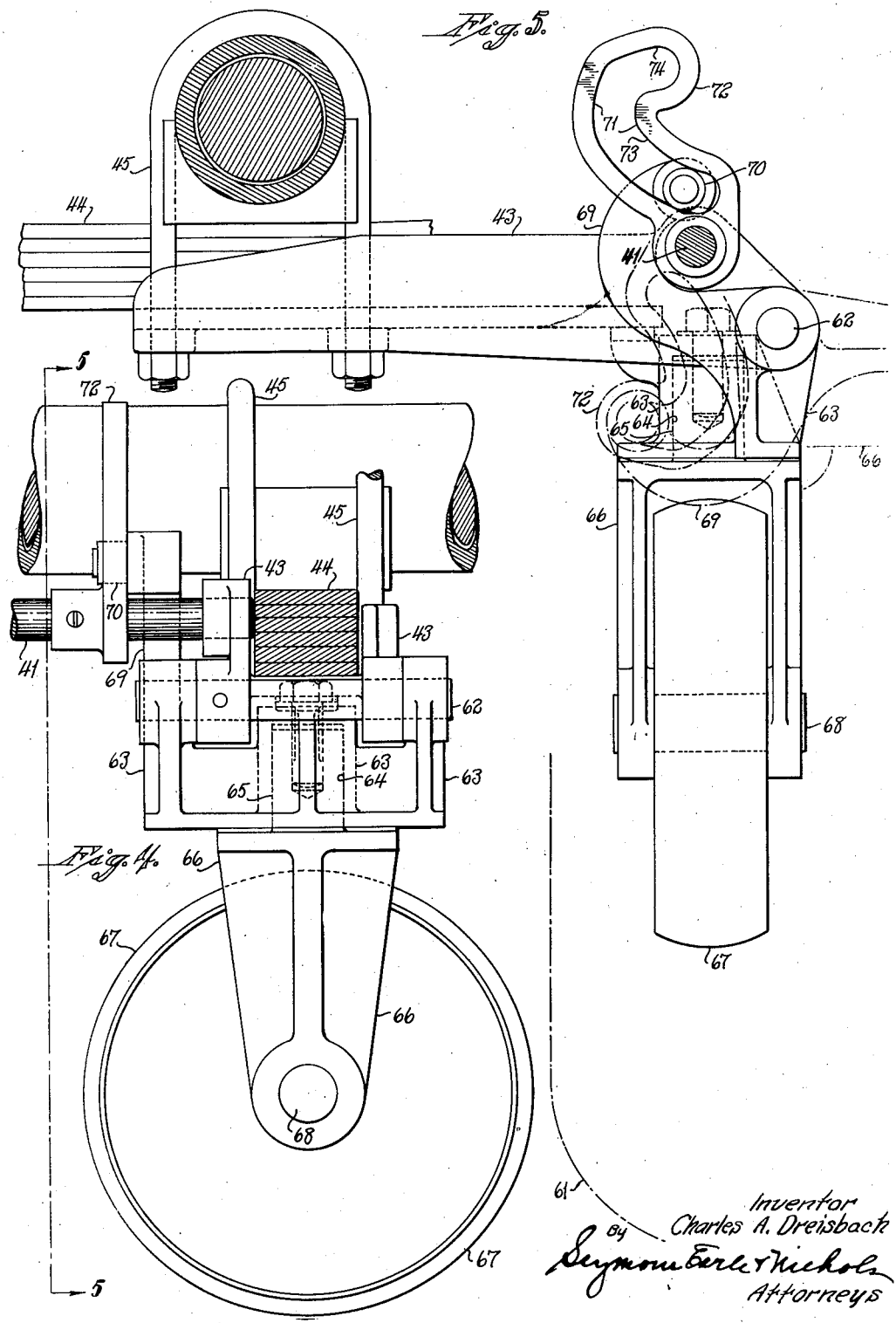
Inventor
Charles A. Dreisbach
by Seymour Earle & Nichols
Attorneys

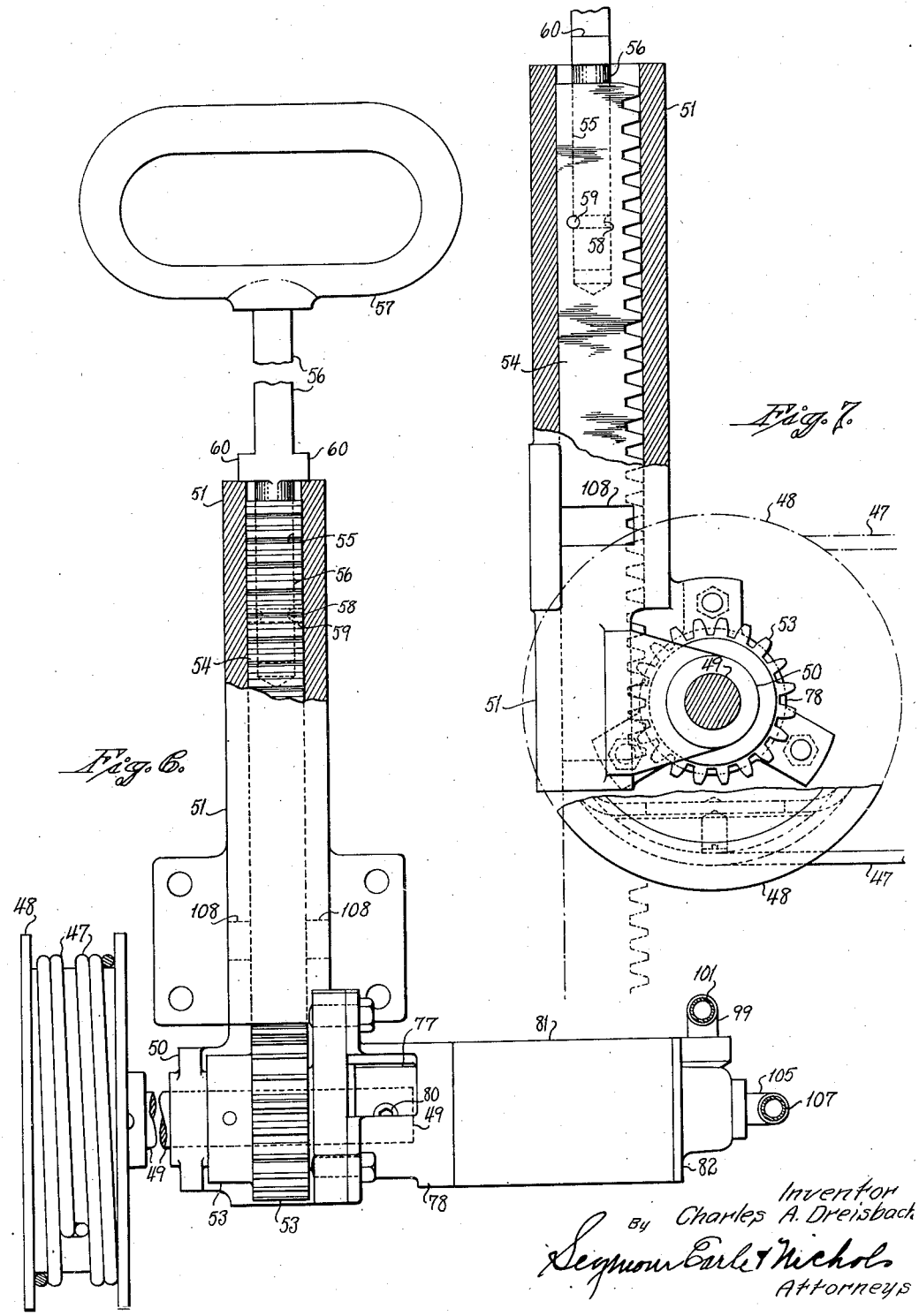

July 11, 1939.  C. A. DREISBACH  2,165,461
SHIFTING DEVICE FOR AUTOMOBILES
Filed June 4, 1937   6 Sheets-Sheet 6
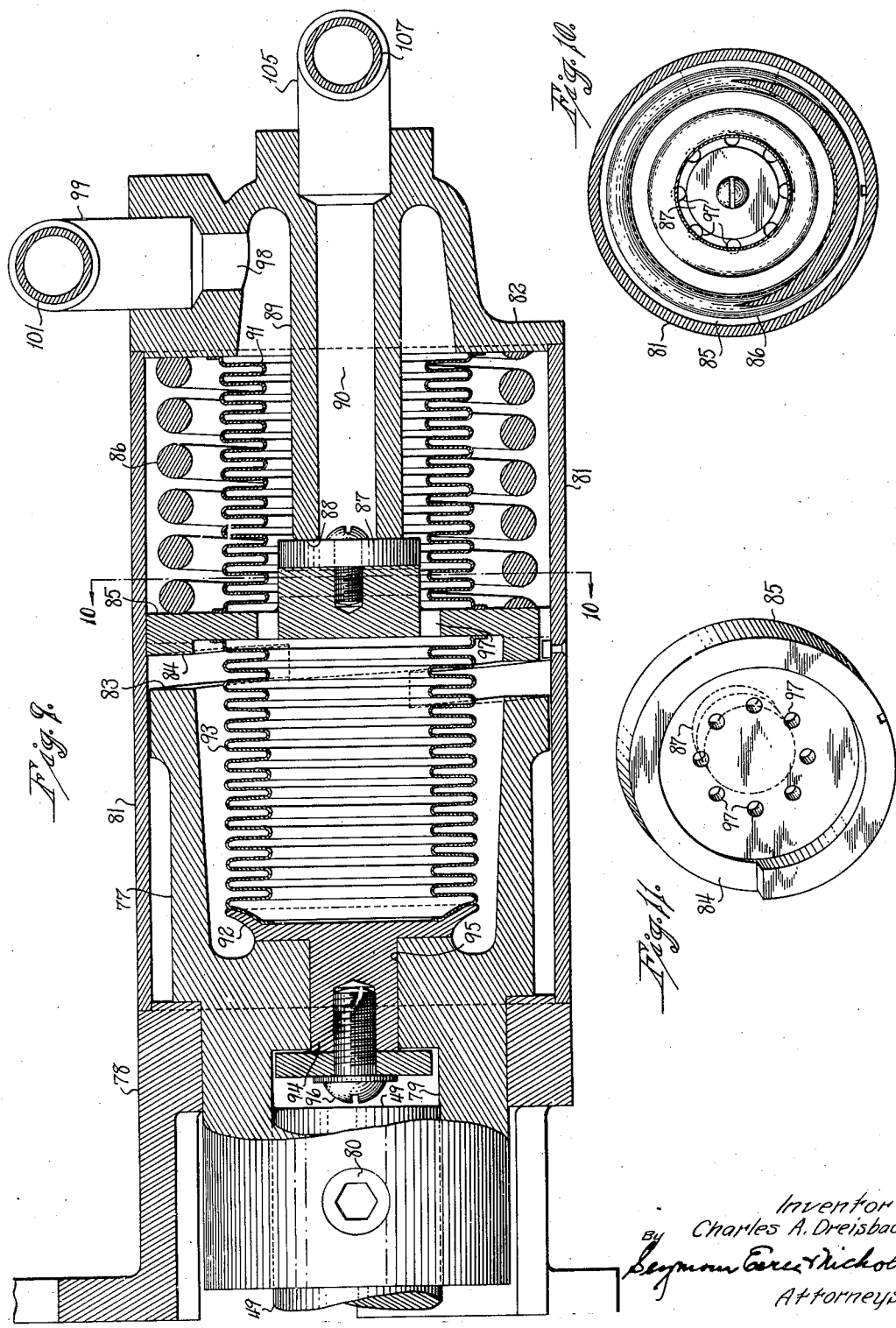
Inventor
Charles A. Dreisbach
By Seymour Earle + Nichols
Attorneys Patented July 11, 1939

2,165,461

UNITED STATES PATENT OFFICE 2,165,461

SHIFTING DEVICE FOR AUTOMOBILES

Charles A. Dreisbach, Yonkers, N. Y.

Application June 4, 1937, Serial No. 146,428

7 Claims. (Cl. 180—1)

This invention relates to an improvement in devices for shifting automobiles, and relates in particular to devices whereby vehicles may be shifted laterally into and out of parking spaces or the like.

One of the objects of the present invention is to provide a superior device by means of which a vehicle may be shifted laterally and characterized by ruggedness, convenience and reliability.

A further object is to provide a superior device of the class described which will in a simple and convenient manner utilize the power plant normally provided for the propulsion of the automobile to effect the lateral shifting of the same.

Another object is to provide a superior shifting device for automobiles, in which the power delivered to the rear wheels may be utilized to effect the lateral shifting of the automobile.

A still further object is to provide, in conjunction with means for shifting the vehicle laterally, automatic means whereby the braking system may be caused to function in such manner as to leave one or more of the wheels of the automobile free for rotation.

Still another object of the present invention is to provide, in conjunction with shifting means, a superior mechanism whereby the braking action of the braking system may be caused to simultaneously brake one of the front wheels of the vehicle and a diagonally-opposite rear wheel thereof, and still leave the remaining two wheels of the vehicle free for rotation.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a schematic plan view of an automobile chassis in which the present invention has been embodied;

Fig. 2 is a broken view in rear elevation of the shifting-wheel and associated parts, the rear left wheel-unit of the automobile being shown by broken lines;

Fig. 3 is a view in left-side elevation of the parts illustrated in Fig. 2;

Fig. 4 is a broken view in rear elevation of the idler- or caster-wheel located adjacent the right-hand rear wheel-unit of the vehicle;

Fig. 5 is a vertical sectional view taken on the line 5—5 of Fig. 4;

Fig. 6 is a broken view partly in vertical section but mainly in rear elevation of the manual operating mechanism, the brake-selector unit and associated parts;

Fig. 7 is a view mainly in left elevation and partly in section of the elements of Fig. 6;

Fig. 8 is a top or plan view of the elements shown in Fig. 6 with the shank of the operating-handle in section;

Fig. 9 is a vertical central sectional view of the brake-selector unit taken on on the line 9—9 of Fig. 8;

Fig. 10 is a transverse sectional view taken on the line 10—10 of Fig. 9;

Fig. 11 is a perspective view of the valve-control head of the brake-selector unit; and Fig. 12 is a similar view of the valve-control sleeve of the brake-selector unit.

The particular shifting device herein chosen for illustration includes a shifting-wheel 20 which is mounted for rotation upon a stud 21, the axis of which latter extends, when the said wheel is in operative position, at a right angle to the axle-housing 22 forming a usual feature of an automobile. The said shifting-wheel is preferably formed of light material, such, for instance, as an aluminum alloy, and has a transversely-convex periphery which may be suitably roughened for tractive engagement with the adjacent inner surface of the tire of the left rear wheel-unit 23 of the automobile.

The stud 21 upon which the shifting-wheel 20 rotates is rigidly mounted in the outer end of a swinging carrier-arm 24 which is formed at its upper end with three (more or less) spaced-apart bearings 25 turning upon a short shaft 26 extending in a direction parallel with the axle-housing 22 at a point slightly below and considerably to the rear thereof. The shaft 26 is rigidly mounted by means of one or more transverse pins 27 in two (more or less) lugs 28 formed at the rear end of a horizontal bracket 29 which is rigidly secured to the axle-housing 22 beneath the spring 30 by means of shackle-bolts 31, which serve also to secure the said spring 30 in place.

As thus constructed and arranged, the shifting-wheel 20 may contact with the ground and rotate in a direction laterally of the chassis about the stud 21, and also the said wheel may be bodily raised and lowered in a manner as will hereinafter appear about the shaft 26 as an axis.

To provide for bodily shifting the swinging carrier-arm 24 toward and away from the adjacent left rear wheel-unit 23 to insure proper tractive engagement of the shifting-wheel 20 with the tire when the carrier-arm 24 is swung downwardly, the inner end of the shaft 26 is provided with a threaded extension 32 upon which is threaded an adjusting-nut 33, a lock-nut 34, and a sliding tubular sleeve 35. The left end of the said tubular sleeve 35 bears against the adjacent one of the three bearings 25 of the carrier-arm 24 and serves, in conjunction with the nuts 33 and 34, to limit the sliding movement of the said arm 24 away from the adjacent left rear tire 23.

The swinging carrier-arm 24, above referred to, is provided with a hook-shaped upwardly and rearwardly projecting extension 36 which carries at its outer end a headed stud 37 upon which is mounted an anti-friction roller 38. The said roller 38 rides within a substantially L-shaped cam-groove 39 formed in a cam-arm 40, which latter is attached to an operating-shaft 41 by means of a key 42 with capacity for swinging movement with the said shaft and freedom for sliding movement axially therealong. The sliding movement of the cam-arm 40 occurs when the swinging arm 24 is adjusted along the axis of the shaft 26.

The operating-shaft 41 bears at its left end in the bracket 29, before described, and extends laterally across the chassis, as will be seen by reference to Fig. 1 in particular, and bears at its right-hand end in a bracket 43 substantially corresponding to the bracket 29, before described, and like the same secured to the axle-housing 22 but in a position beneath the right-hand spring 44 by means of shackle-bolts 45.

The operating-shaft 41, adjacent the bracket 29, has rigidly attached to it a V-groove pulley 46 over which extends an operating-cable 47 having its respective opposite ends wrapped around and secured to an operating-drum 48 which in turn is rigidly attached to a transverse operating-shaft 49 mounted for rotation about midway the length of the chassis and below the upper surface thereof.

The inner end of the operating-shaft 49 above referred to, bears in a forwardly-extending arm 50 forming a feature of a rack-housing 51 which is secured in any suitable manner to a cross-bar 52 of the automobile chassis. Immediately to the right of the arm 50, the operating-shaft 49 has rigidly secured to it a pinion 53 which meshes into a vertically-reciprocating rack 54 sliding within the rack-housing 51 before referred to. The upper end of the rack 54 is formed with a vertical socket 55 receiving with capacity for rotation the lower end of the shank 56 of a loop-shaped operating-handle.

The operating-handle 57, just above referred to, is coupled to the rack 54 for concurrent vertical movement therewith, but with freedom for rotary movement with respect thereto by providing the lower portion of its shank 56 with an annular groove 58 in which bears a coupling-pin 59 extending across the rack 54 in position to intersect the socket 55 therein and to bear in the annular groove 58, just referred to.

At a point slightly above the rack 54, the shank 56 of the operating-handle 57 is provided with a pair of oppositely-projecting locking-lugs 60—60 which are adapted, as shown particularly well in Figs. 6 and 8, to rest upon the top of the rack-housing 54 to positively prevent the rack 54 from descending once the same has been pulled upward to the limit of its movement by means of the operating-handle 57. When it is desired to permit the rack 54 to be moved downwardly, the operating-handle 57 may be given a 90° turn from the position in which it is shown in Fig. 6, whereupon the locking-lugs 60—60 will be swung clear of the upper surface of the rack-housing 51 and may travel downwardly into the interior thereof.

To complement the driven shifting-wheel 20 in supporting the rear end of the automobile sufficiently above the ground surface to free both its left rear wheel-unit 23 and its right rear wheel-unit 61 (Figs. 1, 4 and 5) from the said ground, the bracket 43 has pivoted to it, by means of a shaft 62, a caster-head 63, which latter, together with the parts carried thereby, may be swung rearwardly and upwardly from the position in which it is shown in Fig. 5, and vice versa. The caster-head 63 is formed with a downwardly-opening bearing-socket 64 receiving the upwardly-extending cylindrical stem 65 of a yoke 66, which straddles a caster- or idler-wheel 67 and carries at its lower end a shaft 68 upon which the said caster-wheel 67 rotates.

The caster-head 63, above referred to, is provided with a hook-shaped extension 69 carrying at its upper end a roller 70 bearing in an L-shaped cam-groove 71 formed in a cam-arm 72 corresponding to the cam-arm 40 before described and rigidly attached to the adjacent portion of the operating-shaft 41. The cam-groove 71 of the cam-arm 72, as well as the cam-groove 39 of the cam-arm 40, includes a lifting-portion 73 sloping away from the shaft 41 and an outer locking- or dwell-portion 74 which latter extends substantially concentrically with respect to the operating-shaft 41, with which latter both the cam-arms 40 and 72 turn.

When the operating-handle 57 (located adjacent the driver's seat) is lifted to correspondingly raise the rack 54 (Figs. 6 and 7), the pinion 53, shaft 49 and the operating-drum 48 will be turned and the latter will, through the intermediary of the cable 47, effect the turning of the pulley 46 and hence the operating-shaft 41. The turning of the operating-shaft, as just described, will correspondingly swing the cam-arms 40 and 72 and effect the bodily downward movement of both the shifting-wheel 20 and the caster-wheel 67 from the positions shown by broken lines in Figs. 3 and 5 to the positions shown by full lines in the same figures. As the said wheels 20 and 67 approach the limit of their downward movement, they will contact with the ground and the continued further movement will effect the slight lifting of the rear end of the automobile until both the left rear wheel-unit 23 and the right rear wheel-unit 61 will be raised free of the ground. The shifting-wheel 20, in addition to contacting the ground, as just described, will also be forced into tractional engagement with the adjacent side-surface of the tire of the wheel-unit 23 for being driven thereby. After the brakes of the automobile have been applied, in a manner as will be presently described, the locking of only the right rear wheel-unit 61 and the left front wheel-unit 75 will be effected, thus leaving the left rear wheel-unit 23 and the right front wheel-unit 76 free for rotation.

It may be explained in this connection that inasmuch as the power to drive the shifting-wheel 20 is, in the instance shown, to be derived from the rotation of the left wheel-unit 23, it is necessary under the circumstances to lock the right rear wheel-unit 61 against rotation, since otherwise no effective power could be derived from one wheel-unit if the complementary rear wheel-unit is left free for rotation owing to the characteristics of the usual differential.

It may also be explained in this connection that to facilitate the shifting of the car from the position in which it is shown by full lines in Fig. 1 to the position in which it is shown by broken lines in Fig. 1, it is necessary to leave the right front wheel-unit 76 free for rotation, while maintaining the left front wheel-unit locked against rotation, in order to prevent the bodily forward movement of the car during the operation of laterally shifting the rear end thereof.

To effect the concurrent locking of the right wheel-unit 61 and the left front wheel-unit 75 for the purpose above described, a mechanism is provided which is brought into play by the upward movement of the rack 54 to divert the pressure from the brake-pedal of a hydraulic brake system to the brakes of the left front wheel-unit and the right rear wheel-unit. The mechanism just referred to includes (Figs. 9 to 12) a valve-control sleeve 77 which is mounted for rotation in a bracket 78 rigidly attached to the lower portion of the rack-housing 51 before described. The said valve-control sleeve is formed in its reduced left end with an axial socket 79 receiving the end of the operating-shaft 49 and rigidly coupled thereto by means of a set-screw 80.

The valve-control sleeve 77 rotates freely within a cylindrical fluid-tight housing 81 having its left end closed by the adjacent end of the bracket 78 and having its right end closed by a housing-head 82. The right end of the valve-control sleeve 77 is formed with a helically-inclined cam-surface 83 coacting with a similar cam-surface 84 formed upon the left face of a valve-control head 85 which latter is forced to the left by a valve-opening spring 86 located in the housing 81 and bearing at its left end against the said head 85 and bearing at its right end against the inner face of the head 82 of the housing.

The valve-control head 85 is provided with a washer-like closure or valve-head 87 which is adapted to engage a valve-seat 88 formed at the left end of a tubular portion 89 of the housing-head 82 which provides a fluid-passage 90 through which the fluid of the hydraulic brake system reaches the brakes of the left rear wheel-unit 23 and the right front wheel-unit 76.

Extending between the valve-control head 85 and the housing-head 82 is a metallic bellows 91 which is secured to both the said heads in a fluid-tight manner, such, for instance, as by brazing or soldering. Also extending between the valve-control head 85 and a cap 92 is a metallic bellows 93 secured at its respective opposite ends in a fluid-tight manner to both the said head 85 and the cap 92. The cap 92 is coupled for axial movement with the end-wall of the valve-control sleeve 77 but the latter is free to turn with respect thereto. This coupling is effected by providing the cap 92 with an axial stem 94 extending into a bearing-passage 95 and locked in place against axial displacement by means of a screw 96. To provide communication for the flow of fluid between the chamber formed by the metallic bellows 91 and the chamber formed by the metallic bellows 93, the valve-control head 85 is provided with an annular series of perforations 97.

The interior of the metallic bellows 91 communicates with a passage 98 leading radially outwardly through the housing-head 82 and having soldered or otherwise secured to its enlarged outer end the branch-arm of a T 99. The forward arm of the T 99 is connected by means of a tube 100 to the hydraulic brake mechanism of the left front wheel-unit 75. The opposite or rear arm of the T 99 is connected by means of a tube 101 to the hydraulic brake mechanism of the right rear wheel-unit 61. In the usual manner of hydraulic brakes, the automobile shown in Fig. 1 is provided with a so-called "master" cylinder 102 connected by means of a tube 103 to the tube 100, before referred to, and having its interior piston or plunger operated in the usual manner by a brake-pedal 104.

The outer end of the fluid-passage 90 in the tubular portion 89 of the housing-head 82 is enlarged for the reception of the branch-arm of a T 105 which has its forward arm connected by means of a tube 106 to the hydraulic brake mechanism of the right front wheel-unit 76. The rear arm of the T 105 is connected by means of a tube 107 to the hydraulic brake mechanism of the left rear wheel-unit 23.

Normally the valve-control head 85 in the housing 81 is in the position in which it is represented by broken lines in Fig. 9, in which position the valve-head 87 is clear of the valve-seat 88 and brake-fluid may flow freely from the radial passage 98 in the housing-head 82 through the passage 90 and thence through the tubes 106 and 107 to the hydraulic brake mechanisms of the right front wheel-unit 76 and the left rear wheel-unit 23. When the brake-pedal 104 is operated, regardless of the position of the valve-control head 85, the brake-fluid is always free to flow through the tubes 100 and 101 to the hydraulic brake mechanisms of the left front wheel-unit 75 and the right rear wheel-unit 61.

When, however, the operating-handle 57 is lifted to downwardly swing both the shifting-wheel 20 and the caster-wheel 67, the shaft 49 will be turned, as has been previously described, and in so turning, will similarly turn the valve-control sleeve 77, to thus cause its cam-surface 83, in conjunction with the cam-surface 84 of the valve-control head, to effect the movement of the said head from left to right into the position in which it is shown by full lines in Fig. 9, to thus bring the valve-head 87 into sealing engagement with the valve-seat 88 and thus cut off the flow of brake-fluid to the hydraulic brake mechanisms of the right front wheel-unit 76 and the left rear wheel-unit 23.

It may be here noted that as the valve-control head 85 is moved from left to right, as just described, to close the passage 90, the fluid capacity of the chamber enclosed within the metallic bellows 91 will be diminished and the fluid, which can not now be accommodated in the said chamber, will flow through the perforations 97 into the chamber enclosed by the metallic bellows 93, which latter chamber has, by the movement of the head 85 just referred to, been correspondingly increased in capacity. Thus, despite the movement of the head 85 in either direction, no pressure of a nature to effect the hydraulic brakes will be applied to the said fluid by such movement.

With the brake-control unit in the position in which it is shown in Fig. 9, and with both the shifting-wheel 20 and the caster-wheel 67 in engagement with the ground, the mechanism is in position to effect the movement of the rear end of the automobile from the position in which it is shown by full lines in Fig. 1 to the position in which it is shown by broken lines in the said figure.

The operator will now depress the brake-pedal 104 to thus lock the left-front wheel-unit 75 and the right rear wheel-unit 61 and will set the gear-shift (not shown) into any one of the so-called "forward" speeds, so that when the clutch is let in, in the usual manner, the left rear wheel-unit 23 will be turned forwardly in the same manner as though the said wheel were driving the automobile. Now, owing to the tractional contact between the shifting-wheel 20 and the tire of the wheel-unit 23, the shifting-wheel will be turned in a clockwise direction, as viewed from the rear, with the effect of forcibly shifting the rear end of the automobile to the right until the clutch of the automobile is again depressed to stop the rotation of the wheel-unit 23.

When it is desired to shift the rear portion of the automobile from the position in which it is shown by broken lines in Fig. 1 outwardly toward the position in which it is shown by full lines in the same figure, the transmission of the automobile will be set to give a reverse drive upon the left rear wheel-unit 23, which will in turn effect the counterclockwise rotation of the shifting-wheel 20.

When it is desired to have the rear wheel-units 23 and 61 regain contact with the road surface for ordinary driving of the car, the operating-handle 57 will be turned one-quarter turn to free its locking-lugs 60—60 from the upper surface of the rack-housing 51 and the said handle will be thrust downwardly to depress the rack 54. The depression of the rack, just referred to, will through the pinion 53 turn the operating-shaft 49 to concurrently turn the operating-drum 48 and the valve-control sleeve 77. This rotation of the valve-control sleeve 77 will permit the valve-control head 85 to move into the position in which it is indicated by broken lines in Fig. 9, to thus restore the hydraulic braking system to normal condition, wherein the depression of the brake-pedal 104 will effect the energization of the hydraulic brake mechanisms of all of the four wheel-units.

The rotation of the drum 48, as just above described, will, through the intermediary of the cable 47 and the pulley 46, effect the turning of the operating-shaft 41 and the cam-arms 40 and 72 in a counterclockwise direction, as viewed in Figs. 3 and 5, thereby effecting the similar swinging movement of the shifting-wheel 20 and the caster-wheel 67. When the said wheels 20 and 67 have been swung up into substantially a horizontal position, the rollers 38 and 70 will be located respectively in the locking-portions 74 of the cam-arms 40 and 72, thus holding the said wheels 20 and 67 in their raised positions until such time as the control-shaft 41 has again turned in a clockwise direction by means of the operating-handle 57.

When the rack 54 has been depressed as described it may be locked against accidental upward movement by giving the operating-handle 57 a one-quarter turn to engage its locking-lugs 60—60 with locking-recesses 108—108 in the rack-housing 51.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A device for laterally shifting automobiles including in combination: a shifting-wheel rotatable in a direction transverse of and organized with an automobile structure adjacent one of the driving wheel-units thereof and mounted with capacity for bodily movement into and out of concurrent tractive engagement with the said driving-wheel unit and a road surface; and manually-controlled operating means serving to advance the said shifting-wheel into the said concurrent tractive engagement with the said driving-wheel unit and the said road surface to be transversely driven by the said driving-wheel unit along the said road surface, and the said operating-means being also operable to retire the said shifting-wheel, and including a roller and a coacting cam having a dwell-portion coacting with the said roller to hold the said shifting-wheel in its retired position.

2. A device for laterally shifting automobiles including in combination: a shifting-wheel rotatable in a direction transverse of and organized with an automobile structure adjacent one of the driving wheel-units thereof and mounted with capacity for bodily swinging movement forwardly and rearwardly with respect to the automobile structure into and out of concurrent tractive engagement with the said driving wheel-unit and a road surface; and manually-controlled operating means serving to bodily swing the said shifting-wheel into the said concurrent tractive engagement with the said driving-wheel and the road surface to be transversely driven by the said driving-wheel unit along the said road surface, and the said operating-means being also operable to retire the said shifting-wheel and including a roller and a coacting cam having a dwell-portion coacting with the said roller to hold the said shifting-wheel in its retired position.

3. A device for laterally shifting automobiles including in combination: a carrier-arm pivoted to an automobile structure adjacent one of the driving wheel-units thereof for swinging movement forwardly and rearwardly with respect to the automobile structure; a shifting-wheel carried by the said carrier-arm at a point removed from the point of the pivotal attachment of the said carrier-arm to the automobile structure and rotatable in a direction transverse of the automobile structure, the said shifting-wheel being mounted upon the said carrier-arm so as to be concurrently movable bodily into the said concurrent tractive engagement with the said driving wheel-unit and a road surface to be transversely driven by the said driving-wheel unit along the said road surface; and manually-controlled operating means serving to swing the said carrier-arm to move the said shifting-wheel into and out of operative position, and including a roller mounted on said carrier-arm and a cam propelling the said roller.

4. A device for laterally shifting automobiles including in combination: a shifting-wheel rotatable in a direction transverse of and organized with an automobile structure adjacent one of the driving wheel-units thereof and mounted with capacity for bodily movement into and out of concurrent tractive engagement with the said driving wheel-unit and a road surface; and manually-controlled operating means operatively connected to and serving to advance the said shifting-wheel into the said concurrent tractive engagement with the said driving wheel unit and the said road surface to be transversely driven by the said driving-wheel unit along the said road surface, and the said operating-means being also operable to retire the said shifting-wheel; the said operating means including a rotatable cam and a roller engaging therewith, the said rotatable cam having an operating-portion extending away from its axis and a locking-portion extending substantially concentrically with respect to the axis about which the said rotatable cam turns.

5. The combination with an automobile structure having hydraulic braking system serving each of its laterally-opposite driving wheel-units; of a device for laterally shifting automobiles, including a shifting-wheel rotatable in a direction transverse of the automobile and driven by one of the driving wheel-units of the automobile; and manually-controlled valve-means normally inactively associated with the driving-wheel units and operable to cut off the fluid pressure of the hydraulic brake system from the brake mechanism of the driving wheel-unit by which the said shifting-wheel is driven.

6. The combination with an automobile structure having two front wheels and two rear driving-wheels and a brake mechanism for each of the said four wheels; of a device for laterally shifting automobiles, including a shifting-wheel rotatable in a direction transverse of the automobile and driven by one of the driving wheel-units of the automobile; and means normally inactively associated with the driving-wheel units and operable to selectively render inoperative the brake mechanism of the driving-wheel by which the said shifting-wheel is driven and also the brake mechanism of the diagonally-opposite front wheel.

7. The combination with an automobile structure having two front wheels and two rear driving-wheels and a hydraulic brake mechanism for each of the said four wheels; of a device for laterally shifting automobiles, including a shifting-wheel rotatable in a direction transverse of the automobile and driven by one of the driving wheel-units of the automobile; and valve-means normally inactively associated with the driving-wheel units and operable to cut off the fluid pressure of the hydraulic brake system from the braking mechanism of the driving-wheel by which the said shifting-wheel is driven and also the hydraulic brake mechanism of the diagonally-opposite front wheel.

CHARLES A. DREISBACH.